Figure 1:
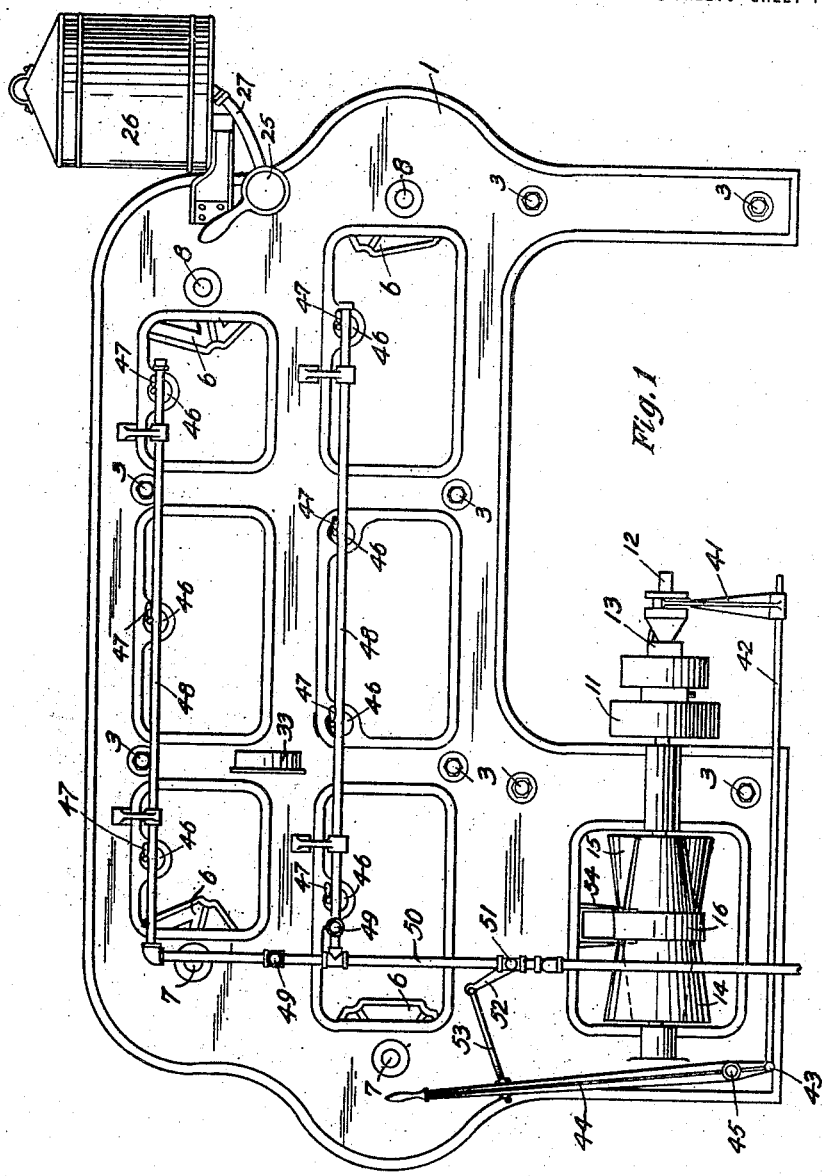

O. GARRISON.
BAKING MACHINE.
APPLICATION FILED JAN. 20, 1913.

1,203,108.

Patented Oct. 31, 1916.
3 SHEETS—SHEET 1.

Witnesses
L. W. Prost
A. L. Phelps

Inventor
Orlando Garrison

By
C. C. Shepherd
Attorney

O. GARRISON.
BAKING MACHINE.
APPLICATION FILED JAN. 20, 1913.
1,203,108.
Patented Oct. 31, 1916.
3 SHEETS—SHEET 2.
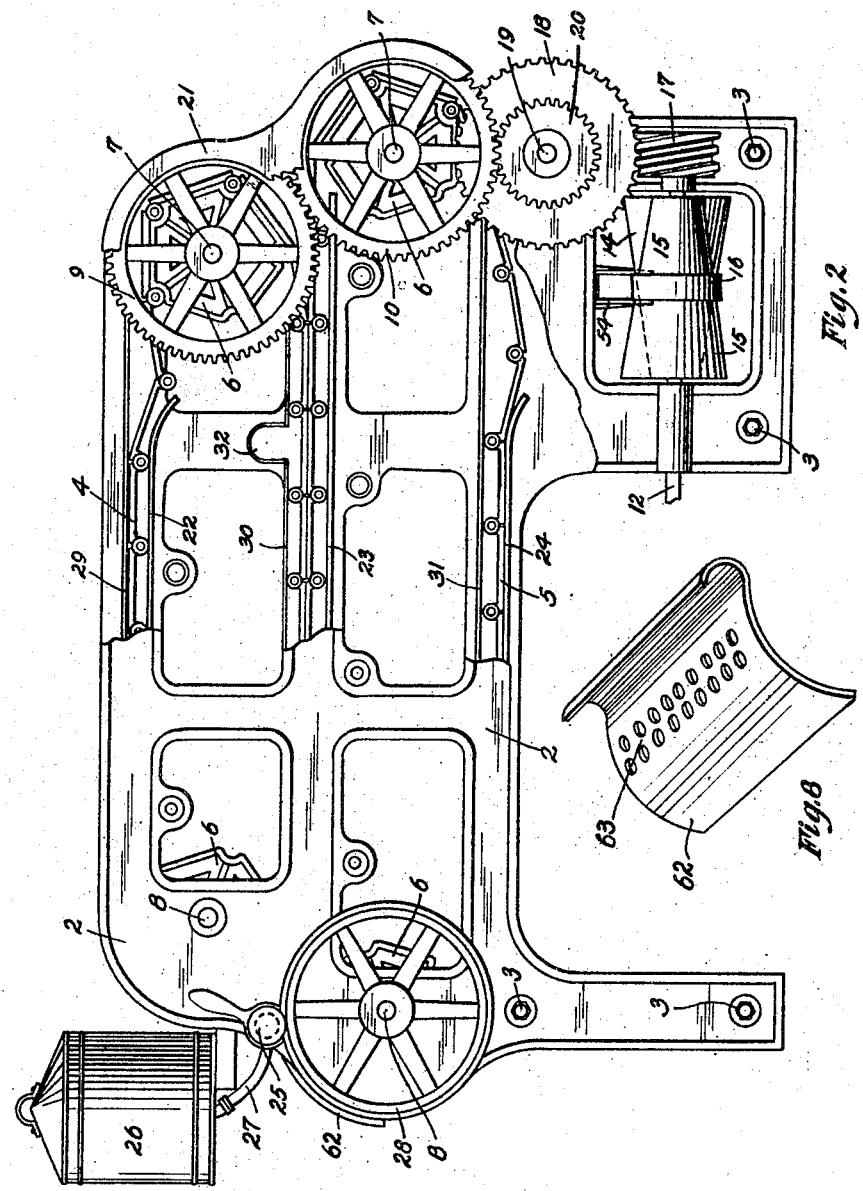
Witnesses
L. W. Brosh
A. L. Phelps
Inventor
Orlando Garrison
By C. C. Shepherd
Attorney O. GARRISON.
BAKING MACHINE.
APPLICATION FILED JAN. 20, 1913.
1,203,108.
Patented Oct. 31, 1916.
3 SHEETS—SHEET 3.
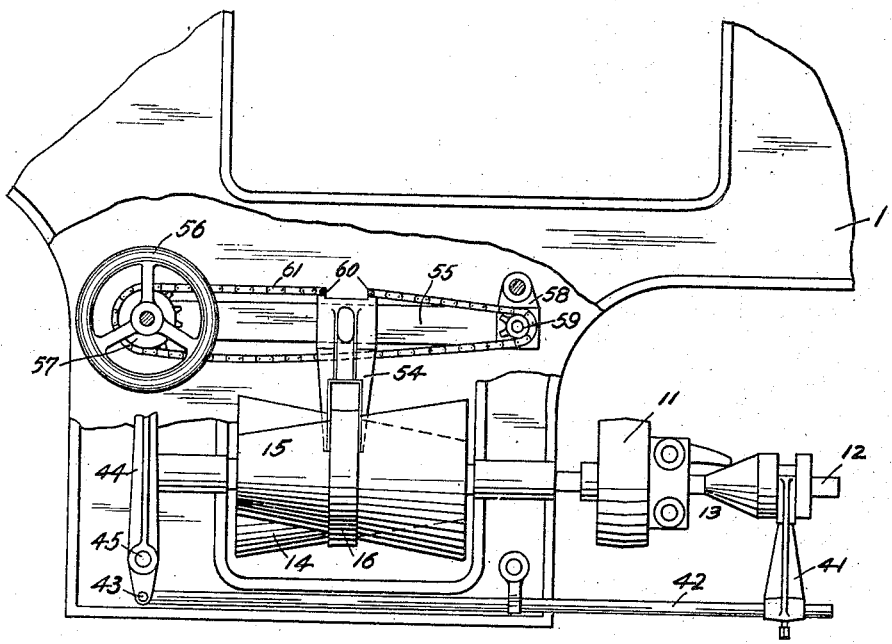
Fig. 4
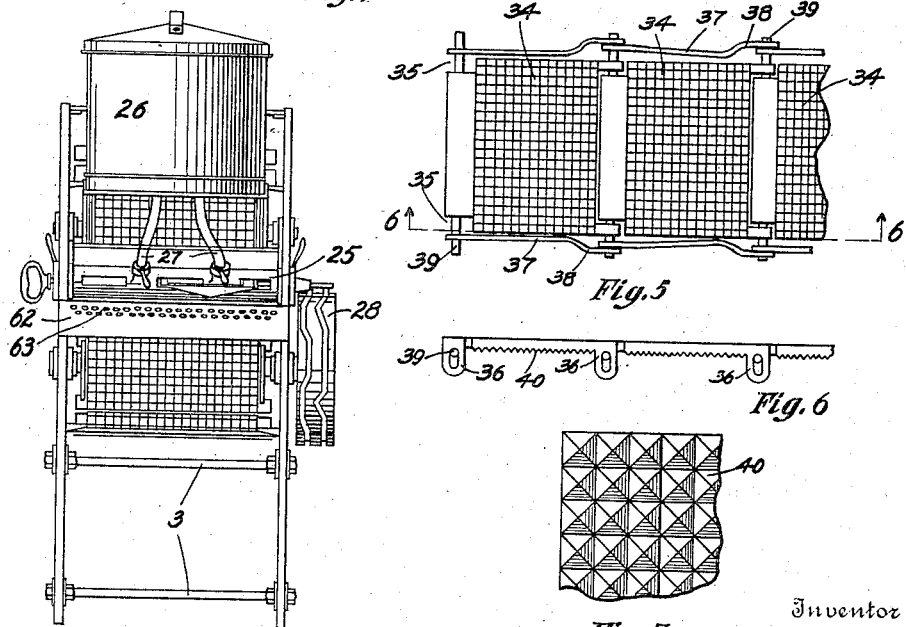
Fig. 3
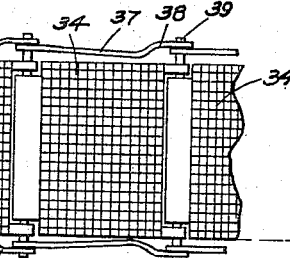
Fig. 5
Fig. 6
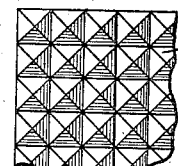
Fig. 7
Witnesses
L. W. Frost
A. L. Philps
Inventor
Orlando Garrison
By C. C. Shepherd
Attorney

UNITED STATES PATENT OFFICE.

ORLANDO GARRISON, OF DAYTON, OHIO, ASSIGNOR, BY MESNE ASSIGNMENTS, TO THE TURNBULL MANUFACTURING COMPANY, OF WILMINGTON, OHIO, A CORPORATION OF OHIO.

BAKING-MACHINE.

1,203,108. Specification of Letters Patent. Patented Oct. 31, 1916.

Application filed January 20, 1913. Serial No. 743,009.

*To all whom it may concern:*

Be it known that I, ORLANDO GARRISON, a citizen of the United States, residing at Dayton, in the county of Montgomery and State of Ohio, have invented certain new and useful Improvements in Baking-Machines, of which the following is a specification.

My invention relates to baking machines and is particularly related to that type of machine used for baking ice cream cone wafers.

In its preferred form, my invention is of particular advantage in that type of machine wherein one or more series of baking plates in chain-like array are used for the reception of batter and the subsequent baking of wafers to be molded in the form of ice cream cones.

In a baking machine taken in the form of an endless carriage, one of the primary features of my invention resides in the provision of a peculiar structure for the automatic compensation of the variations in length of the chain, such variations being caused by the expansive properties of the chain when subjected to the influence of applied heat. In its preferred form, this compensatory action is caused by the weight of the chain element itself, due to the influence of gravity. More specifically, one strand of the endless chain of baking plates is allowed a free sagging and in this manner automatically renders the other strand properly taut and this condition exists regardless of the amount of expansive and contractive actions due to the variations of applied heat.

Another feature of my invention, which is particularly applicable to chain baking machines, resides in the provision of an improved structure wherein the baking units are at determined intervals, caused to pass through heat retaining ovens, within which is confined a sufficient quantity of heat to maintain the desired temperature for baking. This is in the nature of an improvement over existing chain baking machines, wherein the entire casing structure of the machine is maintained under subjection to a high degree of heat. I have found in practice that it is advisable and advantageous to pass the baking plates through ovens of confined volume for the heating of such baking plates. These ovens, it being understood, are desirably heated by a series of burner elements disposed at intervals therein.

Another feature of my invention applicable to baking machines in general, presents itself in the form of a simultaneous dual control, or, in other words, a speed controlling device which is coöperative with the controlling means for the heating elements to automatically shut off these elements simultaneously with the stopping of the baking machine. I have found that where a baking machine has been temporarily stopped, the invariable result is that the heating elements, preferably in the form of gas burners, are left in operation and in this manner departing from the uniformity of heat of the baking units and also burning whatever wafers may be in their process of formation. By automatically rendering the heating elements ineffective with the stopping of the machine, these undesirable results are eliminated. I also desirably use an adjusting mechanism in conjunction with, but separately operable from the above mentioned speed control. This adjusting mechanism is for the purpose of independently varying the speed of the baking action to agree with the amount of applied heat. Specifically stated, the heating elements are adjusted as desired and the supplemental speed control may then also be adjusted to completely bake each successive wafer as it passes through its normal cycle of operation. I also desirably use a heat indicating means, preferably in the form of a pyrometer in conjunction with the heating elements.

One other important feature of my invention resides in the peculiar construction of baking units. I have found that when the batter is deposited upon the baking plates and these plates subjected to the influence of heat, the inevitable tendency is for the batter to expand due to its inherent qualities and also that steam or other vapors are generated. If these generated vapors are not permitted to escape, there will be formed irregular pocket formations, in which the vapors are held captive and these pocket formations are not allowed to bake uniformly with the remaining portion of the wafer. Consequently, aside from these formations, there are also formed different colored spots, usually white, upon the wafer surface and it is these undesirable features that my invention aims to overcome. Various endeavors have been made to permit the escape of the generated vapors by corrugating the complemental surfaces of the baking units and these endeavors have met with varying degrees of success. I aim to have one of the baking plates forming a part of these units, mounted in a manner to be yielding in a direction away from its opposing plate. In other words, this complemental plate is allowed to "float" and any steam that may be generated, will be permitted to escape by its own pressure, whereby the complemental plate is slightly moved outwardly. I have also increased the efficiency of my baking units, by providing an abnormal heat absorbing surface. This is accomplished preferably by the provision of regularly spaced formations upon that side of the plate to which the heat is applied. It will be readily understood that the amount of heat absorbed by the baking units, is increased in a definite ratio with the amount of heat absorbing surface.

The preferred embodiment of my invention is shown in the accompanying drawings, in which similar characters of reference designate corresponding parts, and in which:

Figure 1 is a side elevation of my improved baking machine shown in its assembled condition, Fig. 2 is an elevation taken from the opposite side of that shown in Fig. 1 and partially broken away, showing the operation of the baking chains, Fig. 3 is an end elevation looking from the left of the structure shown in Fig. 2, Fig. 4 is an enlarged detail of a portion of the structure shown in Fig. 1, and partially broken away to show the speed adjusting mechanism, Fig. 5 is a detail view in plan showing the preferred type of floating baking plate, Fig. 6 is a view taken on line 6—6 of Fig. 5 and looking in the direction of the arrows, Fig. 7 is a detail view of a portion of the heat absorbing surface of my improved baking plate, and, Fig. 8 is a detail view in perspective of a peculiar type of guard element utilized by me for preventing the baking of the batter in the discharge pump structure.

In the drawings, my baking machine is shown as comprising complemental side castings 1 and 2 having downwardly extending supporting legs and rigidly held in spaced relation with each other by a plurality of tie rods 3 mounted in any desired position. Supported between these side castings 1 and 2 are two endless chains of baking plates 4 and 5 passing over peculiarly shaped sprockets 6 supported upon shafts 7 and 8, which shafts are driven by complemental intermeshing gears 9 and 10. Power is supplied to these gears through a pulley 11 mounted upon a shaft 12 and normally running idle, but adapted for power transmission through the operation of the clutch mechanism shown at 13. The shaft 12 carries a cone pulley 14, which pulley is adapted to drive a complemental cone pulley 15 mounted upon the opposite side of the baking machine through the medium of a drive belt 16 and under the control of adjusting mechanism to be hereinafter described. Upon the shaft carrying the cone pulley 15 is a worm 17 meshing with the worm wheel 18 mounted upon a shaft 19 suitably journaled in the side casing 2 and carrying a pinion 20 at its outer extremity. This pinion is adapted to mesh with the gear wheel 10 which in turn imparts motion to the baking chains. A suitable gear guard 21 is also provided to prevent accident.

The baking chains 4 and 5 are comprised of a plurality of individual baking plates arranged in an endless chain formation and are guided in their movement by coaction with laterally extending guideways 22, 23 and 24 upon the side castings 1 and 2. It will be understood that the lower strand of the upper chain 4 is adapted to lie adjacent the upper strand of the lower chain 5 and that batter is adapted to be placed upon the upper strand of the lower chain by means of the pump structure designated 25, which preferably has two discharge ports, it being understood that the baking plates are large enough to accommodate the simultaneous baking of two wafers, said pump structure being fed from a source of supply 26 communicating with the pump through the conduits 27 and normally under the control of the cam wheel 28. The structure of this pump mechanism will not be entered into in detail, but it may be explained that there are a plurality of complemental pistons, which are under the control of the cam wheel 28 and which are adapted to discharge the free flowing batter upon each successive plate as it enters the upper strand. The trackway 23 insures a predetermined path of movement of the coacting baking plates and maintains them in a true horizontal position throughout this movement. These chains will vary in length according to their expansive properties when subjected to the influence of heat and these variations in length are compensated for by the peculiar structure of the trackways 22 and 24. One end of these trackways is spaced somewhat from the chain driving sprockets and the endless nature of these chains causes this suspended portior to exert a tensioning stress upon the remainder of the chain. It will be understood that the sprockets and shafts 8 run idle and the weight of the suspended portion of the chain is transmitted around these sprockets and in this manner maintains the coöperating strands sufficiently taut under all degrees of heat and independent of the amount of expansion or contraction of the metal parts caused by this heat. I also provide metal plates 29, 30 and 31, spanning the distance between the side castings 1 and 2 and above the baking chains to prevent excessive loss of heat due to radiation and in this manner also provide what may be termed heat retaining ovens, as it will be understood that the air lying adjacent these cross plates, will be maintained in a heated condition and in this manner prevent the chains from coming into contact with air at a temperature considerably lower than themselves. The oven formed by the plate 30 is formed with a peculiar hood structure 32 into which is adapted to be inserted a pyrometer 33 for at all times giving a visual indication of the heated condition of the machine.

I have found in actual practice that the thickness of the discharged batter, may vary slightly during the normal operation of the machine and that steam and other gases are also generated during the baking action. To permit the escape of these generated gases and to compensate for the inequalities in thickness of the batter, I have provided a peculiar type of baking plate as indicated in Figs. 5, 6 and 7. It will be understood that the lower chain of plates are pivotally connected together in any desired manner and are guided during their baking movement by the trackways 23. Superimposed upon the upper strand of the chain of baking plates 5 are the plates forming the lower strand of the upper chain 4 and comprise a plurality of individual elements 34 having one edge cut away as at 35 for the reception of the complemental downwardly extending apertured lug structures 36. It will be noted that these lugs have an elongated aperture and are adapted to coact with complemental lugs of a similar nature, lying adjacent the cut away portions 35. Extending longitudinally along each edge of the baking elements 34, are chain links 37 having each end pierced and having one end offset as at 38. These chain links are all connected together by connecting rods 39, which connecting rods are also adapted to pass through the apertured lugs 36 carried by each of the baking elements 34. Thus, it will be noted that each of the baking elements is allowed a certain amount of free movement and this movement, when my machine is in its assembled condition, is in a direction away from the coöperating baking elements comprising the lower chain 5. Thus the pressure of any generated gases will be sufficient to partially elevate these plates to allow their escape and yet their weight is sufficient to permit the forming of the correct type of wafer. It will, of course, be understood that it is only essential to have one of these chains mounted in this manner when used in connection with this particular type of baking machine and its detail description has been set forth when used in this connection. The baking surface of each of the baking elements may be constructed to fulfil any desired requirements as concerns the design of the finished product and the lower or heat absorbing surface of each of these elements, has been provided with an abnormally large surface, in order to more readily facilitate the absorption of the applied heat. This abnormally large surface is provided for in the provision of a plurality of pyramids 40, although it will be understood that the particular shape of these protrusions does not affect its heat absorbing nature, unless they present a greater exposed surface to the action of the heating mediums.

As has been stated, the driving power of the machine is introduced through the medium of the loose pulley 11 and the action of the clutch mechanism 13. The clutch mechanism 13 is shifted under the control of a yoke element 41 rigidly mounted upon a rod 42 which rod is pivotally connected as at 43 to an operating lever 44 fulcrumed intermediate its ends as at 45 to the lower portion of the side casting 1. Heat is applied to the baking machine through the medium of a plurality of gas burners 46 individually regulable by cocks 47 and are supplied through branch pipes 48. Each branch pipe 48 has a regulating valve 49 disposed between its point of jointure with the main supply pipe 50 and the first gas burner 46. Thus, it will be apparent that each gas burner is individually and collectively regulable as regards each series connected to the branch pipes. The main supply pipe 50 also has a shut off valve 51 which valve is operated by the finger 52 under the control of the connecting rod 53 attached in any preferred manner to the operating lever 44. This arrangement of shut off valve is designed to either completely shut off the flow of heating fluid, or to allow only a sufficient flow to serve in maintaining the burners lighted without giving off any appreciable heat when the clutch mechanism 13 is thrown out of gear and the operation of the baking machine stopped. When, however, the baking machine is again started in operation by the shifting of the clutch mechanism by the operating lever 44, the supply valve 51 is simultaneously operated to permit the normal burning of each of the gas burners 46. By means of the individual regulating mechanism for each burner and also by the provision of the controlling valves 49, the baking flames may be regulated to a high degree of uniformity and thus provide an equal heating throughout both strands of chain. If, however, it is desired to increase or decrease the capacity of the baking machine, the belt 16 connecting the cone pulleys 14 and 15, is shifted to increase or decrease, as the case may be, the number of revolutions of the worm 17. The belt 16 is shifted by means of the embracing yoke 54 slidably mounted upon a bar 55 supported by two of the tie rods 3. Rotatably mounted upon one of these tie rods is a hand wheel 56 integrally carrying a sprocket wheel 57. Rigidly mounted upon the other of the tie rods 3 is a depending bracket 58 supporting the opposite end of the bar 55 which has rotatably mounted therein a complemental sprocket 59. The upper portion of the embracing yoke 54 is provided with upwardly extending lugs 60 to which are fastened the two free ends of the chain 61 which is adapted to pass over the sprockets 57 and 59. Thus, when the hand wheel 56 is rotated, the embracing yoke 54 now forming a part of the chain, is caused to move in the desired direction, thus shifting the driving belt 16 to increase or decrease the speed of the machine to any desired degree and the baking time may be accordingly varied.

From the structure shown in Figs. 1, 2 and 3, it will be apparent that the pump structure 25 at all times lies adjacent the two series of baking elements and the heat influence will be more or less effective in partially baking the batter contained within the pump before its discharge upon the baking plates. To guard against this undesirable condition, I have provided a guard plate 62 adapted to be interposed between the pump structure and the baking plates and preferably perforated as indicated at 63. More or less heat from the baking elements will be dissipated through radiation at this point and the inevitable result from an arrangement of this type, is the influx of air around the pump and through the perforations 63 creating a draft around the rear of the guard plate and in this manner preventing caking of the batter within the pump. I have found, that by this arrangement, I am enabled to leave the pump charged with batter and allow the baking machine to cool off over night and still prevent caking of the batter within the pump cylinder.

From the above, it will be apparent that I have provided means for accurately regulating the baking time of the wafers and also that I have provided a very simple heat control arrangement. It will be understood that if it is desired to increase the capacity of my baking machine, all that is necessary is the operation of the hand wheel 56 to shift the belt 16 in the right direction and then by the simple adjustment of the controlling valves 49 in the system of piping supply the fluid to the burners, the amount of heat may also be minutely adjusted to correspond with the increase in speed. If it is desired to temporarily stop the operation of the device, this may be done by shifting of the lever arm 44 which simultaneously shuts off the flow of fluid to the burners 46 and will in this manner prevent burning of the wafers after they have been deposited upon the baking plates. It will further be apparent that I have provided an extremely simple means for permitting the escape of any gases generated within the wafers during their process of baking and also a type of baking plate that is self adjusting to varying thicknesses of wafers and have also provided these plates with an abnormally large heat absorbing surface to more efficiently cause the baking action.

What I claim is:

1. A baking machine comprising a supporting frame, a pair of superposed endless chains mounted to have coincident working faces, and a guide structure for said chains, said chains and said structure being constructed relatively to permit the sagging of the upper strand of the upper chain and the lower strand of the lower chain to automatically compensate for variations in the length of said chains due to the applied heat.

2. A baking machine comprising a supporting frame, a pair of superposed endless chains mounted to have coincident working faces, and a guide structure for said chains, said chains and said structure being constructed relatively to permit the sagging of one strand of each chain to automatically compensate for the variations in length of said chains due to applied heat.

3. A baking machine comprising a plurality of baking units, means for heating said units, driving means for imparting motion to said units, and means for simultaneously cutting off the heating means with the stopping of the motion of said units.

4. A baking machine comprising a supporting structure, an endless chain of baking plates, means for driving said chain, means for heating said chain, and means for simultaneously cutting off the heating means with the stopping of said chain.

5. A baking machine comprising a supporting frame, an endless chain of baking plates, means for driving said chain, burners individually regulable for heating said plates, controlling means operable to simultaneously regulate the flow of fluid to all of said burners, and supplemental means for simultaneously cutting off the flow of fluid with the stopping of said chain of baking plates.

6. A baking machine comprising a supporting frame, an endless chain of baking plates supported at opposite ends by said frame, a system of gas piping for heating said plates, a shut-off valve in the main line of said piping, driving means for said chain, and a lever operatively connected to said driving means to render said means effective or ineffective and connected to said shut-off valve whereby the supply of fuel is automatically turned on or off with the starting or stopping of said driving means.

7. A baking machine comprising a supporting frame, a plurality of baking units, means for heating said units, driving means for imparting motion to said units, and means for simultaneously controlling the supply of heat by the control of said driving means.

8. A baking machine comprising a supporting frame, a plurality of baking plates, a plurality of superposed coöperating plates, an endless chain element to which said superposed plates are attached, said superposed plates being connected to said chain in a manner to permit each to have independent vertical movement away from its complemental baking plate.

9. A baking machine comprising a supporting frame, an endless chain of baking plates pivotally connected together, a superposed endless chain of baking plates, a supplemental chain formed of a plurality of links, lugs on the apex of each plate of superposed chain, said lugs having elongated slots therein extending at right angles to the plane of the plates, and rods passing through said lugs and the links of said supplemental chain whereby the plates are pivotally connected together and are carried by said links.

10. A baking machine comprising a supporting frame, an endless chain of baking plates hingedly connected together, sprockets in opposite ends of said frame over which said chain is adapted to pass, complemental plates adapted for superimposition upon said first plates and individually yieldable in a direction away from said first plates, and means for passing said plates through a heated zone.

11. A baking machine comprising a plurality of baking units formed of coöperating plates arranged in superposed relation, and auxiliary units within which the top plates of said baking units are supported, said top plates being supported in said auxiliary units in a manner to permit their ready self adjustment vertically during the baking period, said top plates and their auxiliary units being also relatively movable away from the remaining structure forming said baking units.

12. A baking machine comprising a supporting frame, an endless chain of baking plates, top plates arranged to coöperate with said endless chain of plates, and auxiliary units within which said top plates are supported, said top plates being supported in said units in a manner to permit their individual adjustment away from the plates of said chain, said top plates and their auxiliary units being also relatively movable away from the plates forming said chain.

13. A baking machine comprising a supporting frame, a lower endless chain of baking plates hingedly connected together, a superposed upper endless chain of baking plates hingedly connected together, the plates on the lower strand of the upper chain and the plates on the upper strand of the lower chain being adapted for superimposition, sprockets in opposite ends of said frame over which said chains are adapted to pass, the plates on the upper chain being connected in a manner to have an individual outward yielding movement, and heating means.

14. A baking machine comprising a supporting frame, a plurality of baking units, means for moving said units through a zone of heat, a batter pump, and a guard plate interposed between said pump and said units and spaced from said units for the creation of a draft to prevent baking of the batter in said pump.

15. A baking machine comprising a supporting frame, superposed endless chains of baking plates coöperatively mounted, a pump, means for moving said chains through a zone of heat, and a perforated plate mounted on said frame and beneath said pump for the creation of a draft carried by the heat of said chains to prevent baking of the batter in the pump.

In testimony whereof I affix my signature in presence of two witnesses.

ORLANDO GARRISON.

Witnesses:
M. L. JACKSON,
ALLEN C. MCDONALD.